W. L. TAGGART.
MACHINE FOR CUTTING THE TOPS OF DOUGH LOAVES.
APPLICATION FILED JAN. 18, 1918.
1,319,189. Patented Oct. 21, 1919.
5 SHEETS—SHEET 1.
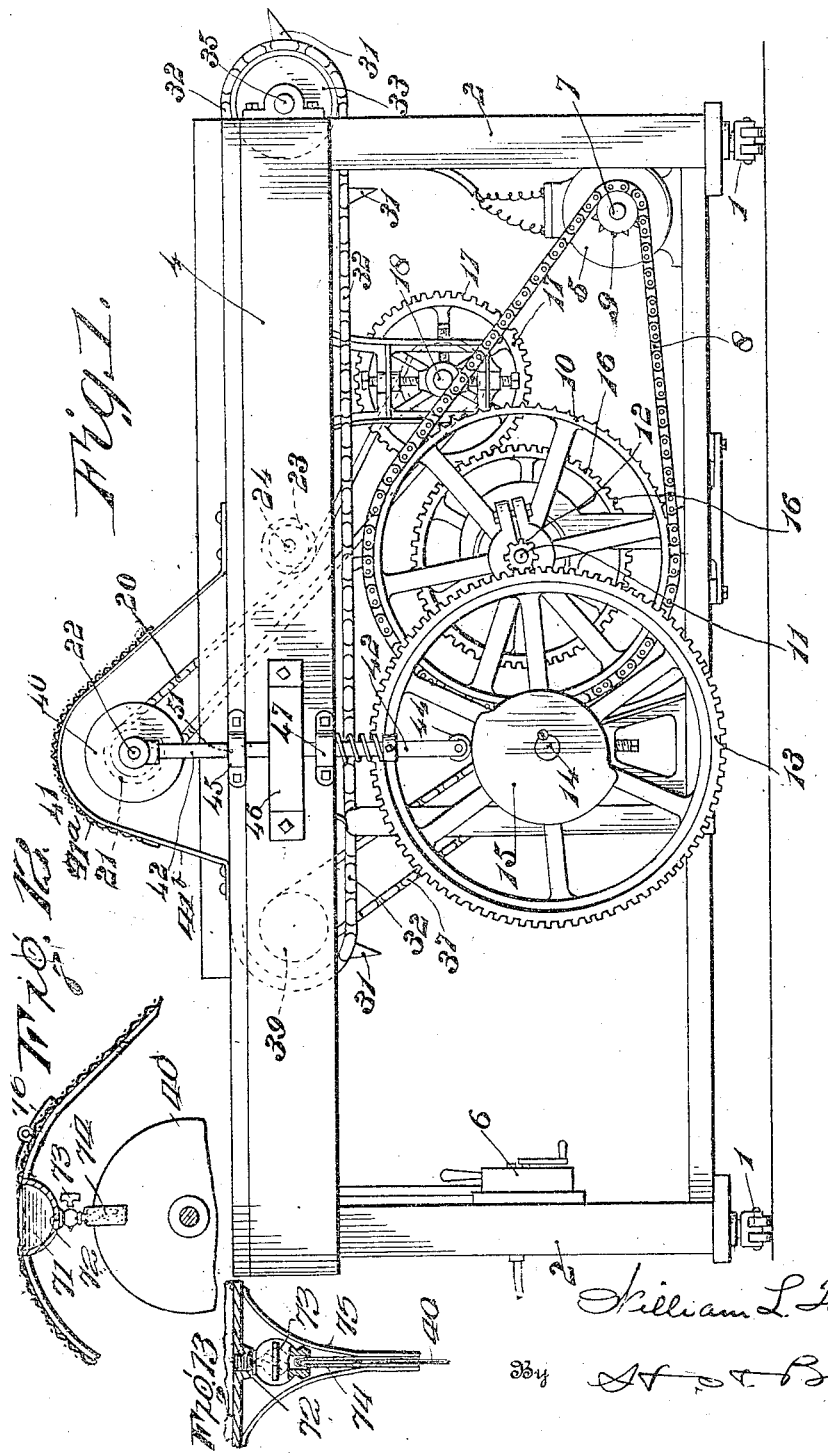
Inventor
William L. Taggart
By
Attorney W. L. TAGGART.
MACHINE FOR CUTTING THE TOPS OF DOUGH LOAVES.
APPLICATION FILED JAN. 18, 1918.
1,319,189.
Patented Oct. 21, 1919.
5 SHEETS—SHEET 2.
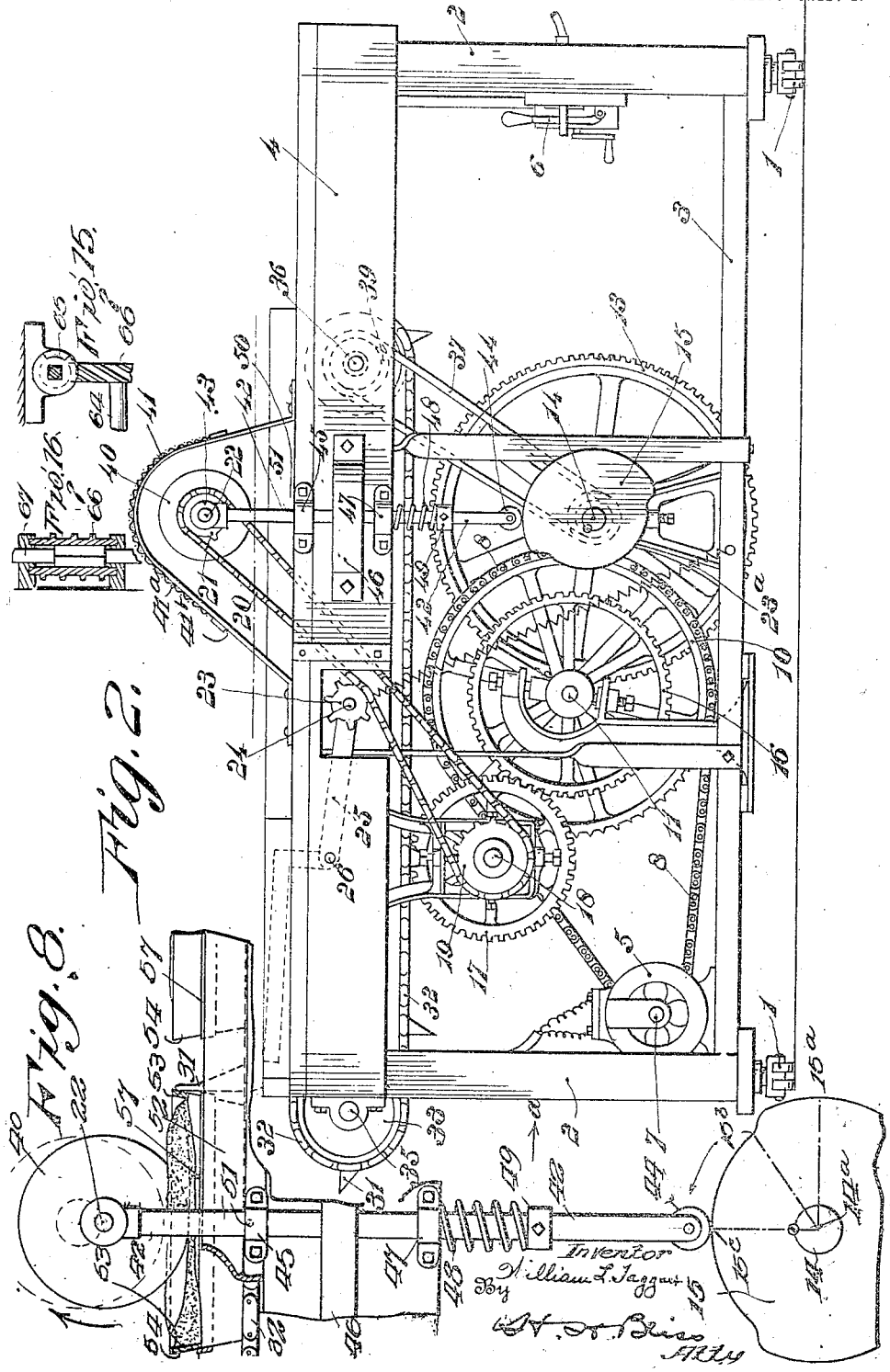

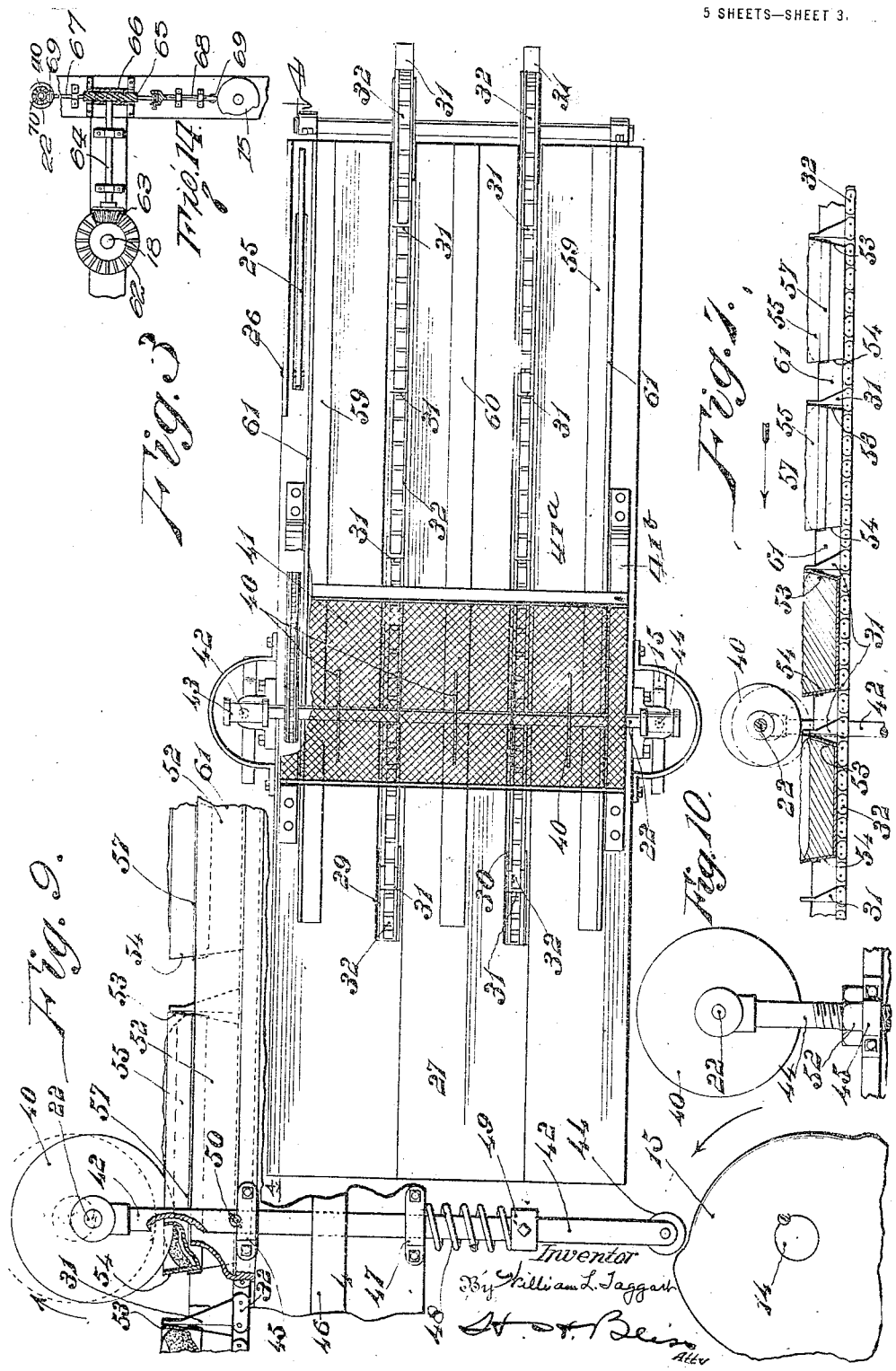

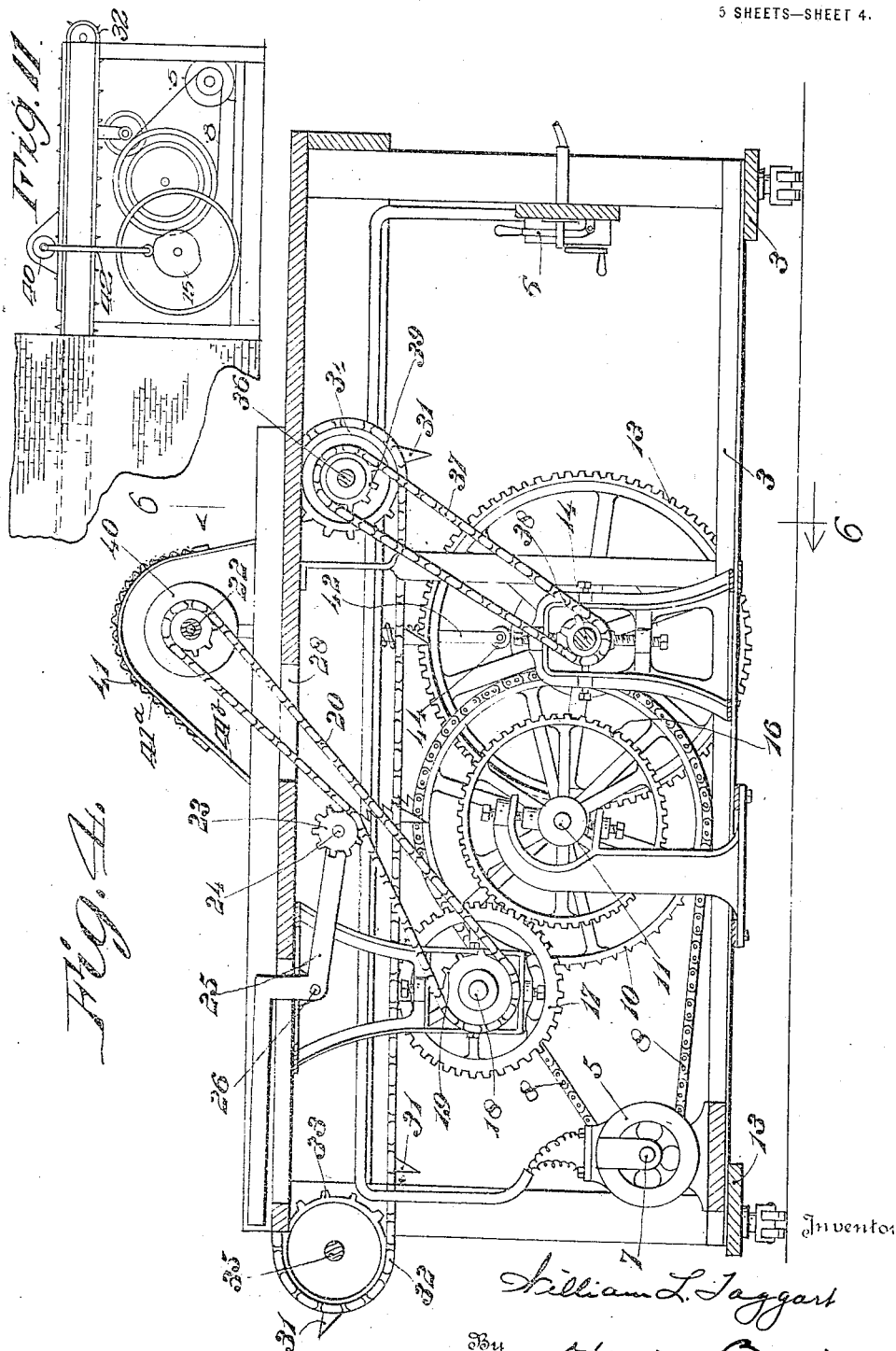

W. L. TAGGART.
MACHINE FOR CUTTING THE TOPS OF DOUGH LOAVES.
APPLICATION FILED JAN. 18, 1918.
1,319,189.
Patented Oct. 21, 1919.
5 SHEETS—SHEET 5.
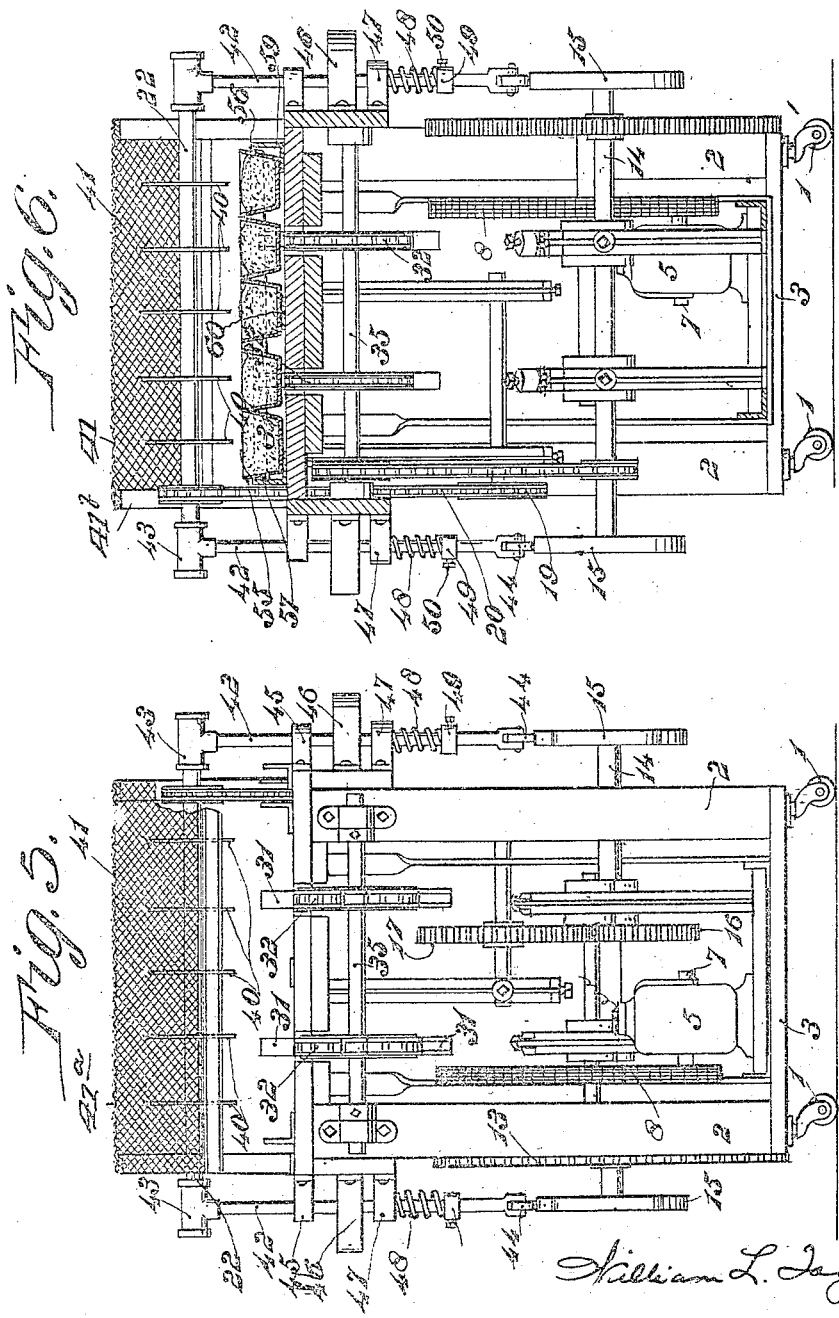
Inventor
William L. Taggart
By N. F. Blish
Attorney

UNITED STATES PATENT OFFICE.

WILLIAM L. TAGGART, OF INDIANAPOLIS, INDIANA.

MACHINE FOR CUTTING THE TOPS OF DOUGH LOAVES.

1,319,189. Specification of Letters Patent. Patented Oct. 21, 1919.

Application filed January 18, 1918. Serial No. 212,459.

*To all whom it may concern:*

Be it known that I, WILLIAM L. TAGGART, a citizen of the United States, residing at Indianapolis, in the county of Marion and State of Indiana, have invented certain new and useful Improvements in Machines for Cutting the Tops of Dough Loaves, of which the following is a specification, reference being had therein to the accompanying drawing.

This invention relates to a novel apparatus for treating dough loaves immediately before they are introduced into the baking ovens. The different stages of the work involved in the production of bread from flour and other initial ingredients may for present purposes be regarded as, first, mixing, second, fermenting, third, loaf forming, fourth, proofing, fifth, top cutting, and sixth, baking, these occurring in the sequence just specified. My invention relates to a mechanism for forming the incisions in the upper part of the dough loaves after the proofing, and before the baking.

From the time the lumps or pieces of dough are cut into predetermined sizes for loaves, and have been placed in the pans, fermentation continues to occur in each loaf mass up to the time of subjecting it to the high heat of the oven, this fermentation with a consequent enlargement of the loaf volume taking place more largely during the stage of proofing. While proofing, the loaves are inclosed in the proofing chambers or ovens. A skin forms at the surface of the material of each loaf. During the period of exposure in the proofing oven, gas is constantly being evolved during the last stage of fermentation and of gas forming, within the dough. This gas forms in the cells and pores through the mass, the globules of gas being surrounded by thin gelatinous cell walls, and the further these activities can be carried the more highly improved is the texture, crumb, color and palatability of the interior of the loaf. And from the time of the termination of the proofing stage until the point of termination of the baking, it is necessary, for superior results, to prevent any reduction in the volume of the loaf or breaking down of the cells.

At the same time there is necessity, (after the proofing has been done, the cells have been formed, the delicate cell walls have been distended, and the total desirable volume has been reached, and prior to introducing the loaves to the high crust-hardening heat of the baking oven,) to form incisions through the comparatively tough dough-covering skin and extending part way down into the mass to provide exits for the quickly heating and rapidly expanding bodies of gas, air and steam, and prevent them from exerting a bursting action.

Heretofore this forming of incisions has been done in a crude manner by manually pressing down upon the top of the dough with a knife. Where thousands of loaves are to be manipulated the deteriorating of the dough by these rapid pressings and blows from the knives has been a serious impediment in the production of bread of the highest grade.

These blows and pressings on the skin of the loaf break down the cell walls and moreover in the earlier practice the knives have been so used that they pass through the dough quite slowly, and the dough adheres to them and this still further tears down the cells. The more the loaf is "proofed" the greater is the attack on the delicate texture, and the more serious is the reduction in the volume. If the earlier method or practice be followed of pressing knives upon the highly proofed thin top skin and dragging them through the upper stratum of the dough, the pressure and dragging of the knives form little nodules or knots of dough which becomes hard particles along the lines of cut during the baking stage.

This has been well-known to bakers; and it has been found necessary to stop the proofing activities at a point much below that which has been known to be desirable, in order that the cell walls will be left thicker and stronger in the upper stratum of the dough to prevent their being torn or pressed downward too much by the knives.

The object of the present invention is to form the incisions through the delicate skin and the delicate cell walls of highly proofed loaves, without exerting downward pressure, and so quickly that the cell walls or interior texture adjacent to the skin will not be torn or broken down simultaneously with the forming of the incisions. And when my improved apparatus is used the proofing can be carried as high as is desired, without such tearing or breaking down.

Figure 1 is a side elevation of the machine selected for illustration.

Fig. 2 is a side view from the side opposite to that shown in Fig. 1.

Fig. 3 is a top plan view.

Fig. 4 is a longitudinal section on the line 4—4 of Fig. 3, looking in the direction of the arrow.

Fig. 5 is an end elevation, looking in the direction of the arrow $a$ in Fig. 2.

Fig. 6 is a vertical cross section on the line 6—6 of Fig. 4, looking in the direction of the arrow.

Fig. 7 is a view of a part of a series of pans.

Fig. 8 is a partial side view of some of the parts illustrating the action of the cutters.

Fig. 9 shows parts similar to those in Fig. 8 together with devices for varying the action of the cutters.

Fig. 10 shows a modification of the stop devices for arresting the down movement of the cutters.

Fig. 11 is a side elevational view, more or less conventional or diagrammatic in character, illustrating the manner in which the active parts of the mechanism are sometimes arranged to deliver directly to the bake oven.

Fig. 12 illustrates devices that are used for moistening or lubricating the edges of the cutters.

Fig. 13 is a cross-section of the same.

Figs. 14, 15 and 16 illustrate a modified driving device for rotating the cutters.

The machine shown comprises a main framework which when portable is supported on rollers 1, the frame having uprights 2, bottom sills 3 and top sills 4, together with such cross pieces and braces as are required to make a solid unitary structure. 5 indicates a motor, and 6 a controller, both of any suitable construction and suitably connected electrically. Sprocket 9 on motor shaft 7 is connected by the belt 8 to sprocket 10 on a transverse shaft 11, mounted in suitable bearings. 12 is a small pinion meshing with wheel 13 on shaft 14. The latter has cams 15, one at each side of the machine, for a purpose to be described.

Gear 16 on shaft 11 meshes with gear 17 on shaft 18, the latter having sprocket 19 connected by chain 20 to a sprocket 21 on shaft 22. 23 is a sprocket, whose shaft 24 is carried by arm 25, pivoted at 26 to frame brackets. Sprocket 23 bears downward by gravity and flexes the chain 20 in such a way as to compensate for the rise and fall of shaft 22. To assist it in holding the chain taut there is a spring 23$^a$ attached to and extending from the end of the arm 25 down to a fixed point on the machine frame, where it is secured. The arm 25 is shown as connected to a handle or lever lying above the table (see Figs. 2 and 4), which can be used to control the action of the spring. Shaft 18 is mounted adjustably in bearings carried by brackets secured to the frame.

27 indicates the table at the top of the frame. It is provided with an opening 28 for the passage of chain 20, and is longitudinally slotted, as at 29 and 30. Endless chains 32 are mounted on the frame to travel adjacent the slots, they carrying lugs or flights 31. The chains and the lugs pass around sprockets 33, 34 on shafts 35 and 36 mounted on a line somewhat remote from the opposite end. Motion is imparted to the sprockets, chains and flights by a chain 37 engaging with the sprockets 38 on the aforesaid shaft 14 and 39 on shaft 36.

In the mechanism illustrated provision is made for advancing through the machine sets of loaf bodies of dough, five in a row, transversely. Each pan 52 has end walls 53, 54 and side walls 55, 56. The five pans of the transverse row are secured together by a band 57, riveted to the pans of the set. The integrated set is placed on the table near the shaft 35, there being horizontal tracks at 59, 60 upon which rests each set of pans, and outside vertical guide flanges 61 which hold the pans against displacement laterally. When the companion lugs or flights 31 on chains 32 come up to the top of the table they engage with the rear walls of two of the pans and push them forward uniformly and with a speed which is in timed relation with the speeds of the other parts of the mechanism.

Shaft 22 carries a plurality of sharpedges thin cutting disks 40, one for each longitudinal series of pans. These disks are rotated when the shaft 22 revolves, and I have so predetermined the relative dimensions and speed ratios of the parts, commencing with the motor, that a very high speed is imparted to these disks. They are kept constantly rotating, and are bodily raised and lowered intermittingly by the cams 15. The shaft 22 is mounted in bearings 43, which are carried by vertically sliding arms or rods 42, one at each side of the machine, and mounted in slide guides at 45, 46, 47. 44 are rollers at the lower ends of the rods 42, resting upon the cams 15. As the shaft 14 revolves the cams intermittingly permit the rollers on the rods 42 to move downward, the shaft 22 and the disks 40 descending to a predetermined distance. To insure their coming down as intended, springs 48 are combined with the rods 42, respectively positioned between the bearing guides 47 and adjustable collars 49. An important requirement for successful work is to prevent the disks from cutting through to the lowermost horizontal planes of the loaf masses. The parts can be so dimensioned and designed that the innermost section of the periphery of each cam 15 will be of a radius long enough to hold its roller 44 and rod 42 up far enough to prevent the disks from cutting through the dough; and the same devices that prevent them from cutting entirely through to the bottom horizontal plane of the dough can be utilized to vary and regulate the depth of the cut. Frequently it is desirable to have the bottom of the incision on a continuously curved line. To accomplish this the cams 15 are made so that the radius from $14^a$, at the center (see Fig. 10), to the periphery at $15^b$, will be shorter than the radius $14^a$—$15^a$ and the radius $14^a$—$15^c$ of the central part of the reduced periphery will be still shorter than the radius $14^a$—$15^b$. In such case the disks 40 will, during the first of each cutting action, continuously descend, will be then stopped, and then continuously raised until they leave the dough.

The disks can be stopped in their descent and caused to form more nearly horizontal cuts by a device such as shown in Figs. 9 and 10. In Fig. 9, a detachable pin 50 is inserted into an aperture 51 (see Fig. 8) which contacts with the top of a frame piece and prevents rod 42 of the disk descending the full possible distance. In Fig. 10 the same purpose can be accomplished by a stop-nut 52 which can be adjusted higher or lower as desired.

By these or equivalent means the cutters are not only prevented from moving to the bottom of the dough but can be caused to form cuts of such shapes and depths as may be desired.

41 is a covering or protector extending over the cutters to protect operators from injury. As shown, it is composed of a reticulated sheet $41^a$ supported on uprights or brackets $41^b$ secured to the frame.

As already noted the cutters rotate with great rapidity, from 1700 to 2000 revolutions per minute being necessary. In some cases an initial motor as at 5 of very high speed is not desirable, and in such cases a transmitting mechanism other than the sprockets and sprocket chain at 19, 20, and 21 can be used. In Figs. 14, 15 and 16 a modified driving mechanism which I have also employed is shown. Here the shaft 18, by suitable gearing at 62, 63, rotates shaft 64; this by worm wheel at 66 rotates the worm 65. Through this worm the rod 67 passes, the rod at the lower end having loose engagement with the non-rotating support 68 of the roller 69 adapted to engage with a cam 15. At the upper end the shaft 67 is connected by gearing 69, 70 to the disk shaft.

If a speed still higher is desired a driving worm gear and driven worm can be substituted for the gears at 62, 63.

This exceedingly high speed of the disks I have found necessary for successful work.

Disks can be made thin and very sharp, and while in action can be held constantly in perfect alinement relatively to the dough mass, and can be rotated, as described, with a peripheral speed of hundred of inches per second, so that there is exceeding quickness in their action. They cut delicately through the skin, without exerting any downward pressure upon it, and cut through the thin walls of the gas cells without breaking down or tearing them at points near the skin. So great is the tendency of the cell walls and the skin to resist severing, and, at the same time, to adhere to the cutter, that with some materials it is advantageous to employ moistening or lubricating devices for the edges of the cutters, as shown in Figs. 12 and 13.

In order to eliminate entirely the possibility of tearing the cell walls or the skin that sustains them through adhesion of any of the dough to the disks I provide moistening or lubricating devices for their edges, as shown in Figs. 12 and 13. 71 is a duct or elongated vessel extending across the tops of the cutter disks, and adapted to hold water or a suitable oil. Oil is permitted to travel downward through passages at 72 controlled by valves 73. To the lower end of each valve duct are attached sheets or pieces of absorbent material such as felt or cloth arranged to contact with the peripheral parts of the disks. Springs such as those at 75 can be used to gently press the flaps of absorbent against the disk faces. The lubricant or fluid will keep the surfaces in such condition that they will not adhere to the dough.

The operation of a machine having parts such as desscribed will be readily understood. It is placed in a suitable position adjacent to the doorway of the baking oven and then one of the wheeled racks used in bakeries is placed conveniently near the end of the machine; these racks being filled with pan sets that have been removed from the proofing oven.

The disks and their supporting devices having been arranged so as to attain the desired depth and shape of the incisions, and the power connections having been made, the movable parts are set in operation, these being the feeding chains 32 with their pan-pushing lugs 31, the disks 40 and the driving devices intermediate of the motor and the driven parts.

The pan sets (each set here comprising five pans) are placed one after the other on the table. The lugs 31 engage with a set and it is pushed with uniform speed toward the The parts are so timed that immediately after the front wall of the pans of a set move across the vertical plane of the disk axis the rollers 44 and the rods 42 quickly descend to the depth permitted by the stop devices, whether the latter be the reduced part of the cam periphery, or whether adjustable stops such as those at 51 or 52 be used.

The disks rotating, as above described, with great rapidity, delicately cut through the skin without pressing upon or depressing it and form incisions through the cell walls from end to end of each dough loaf. At the instant when the rear walls 54 of the pans come close to the disks the cams are rotated far enough to bring their higher peripheral edges to the rollers 44 and then the disks are quickly lifted out of the pans. They are carried up far enough to escape the projecting walls of the pans and are held up until the next transverse series of pans arrive; and then, automatically, the series of movements of parts is repeated.

What I claim is:

1. In a machine for forming incisions in the upper parts of dough loaves, the combination of a movable pan carrier, uniformly-speeded pan-propelling devices on the carrier, an upward-and-downward-moving, power-driven, rapidly-rotating cutter disk normally positioned in horizontal planes above the walls of the pans when in position on the carrier, and means timed in relation to the pan-propelling devices to move the disk, while rotating, down immediately behind the front wall of each pan, and to lift it to its upper position on the vertical lines immediately in front of the rear wall of each pan.

2. In a machine for forming incisions in the top portions of dough loaves, respectively positioned in uniformly-sized four-walled pans arranged to advance in several longitudinal series, the combination of uniformly moving means adapted to separately engage with the pans and advance them in continuous succession, a power device for moving said means, vertically-movable, continuously-rotating, sharp-edged cutter-disks, power actuated means acting in timed relation with the pan-moving means for moving the said disks while rotating, down and causing them to penetrate the top parts of the dough masses, and means for stopping the downward movement of the disks before their edges move to the lowermost planes of said masses.

3. In a machine for forming incisions in the upper parts of dough loaves, the combination of an endless pan-carrier having at intervals uniformly-spaced devices adapted to engage with pans having vertical walls rising above the bottoms of the dough loaves to advance them, an up-and-down-moving, rapidly-rotating thin cutter-disk adapted to be held in relatively elevated horizontal planes while the pan-moving devices and pan walls are moving under the disk, means timed with the travel of the pan-moving devices to cause said disk to move upward before the said pan-moving devices and pan walls, successively, reach it, and to move downward after the said pan-moving devices have traveled beyond the vertical lines of the lowest point of the disk, and means for preventing the disk from cutting entirely through the dough mass to the bottom thereof.

4. In a machine for forming incisions in the upper parts of dough loaves, the combination of a table, one or more endless carriers moving along the top of the table, uniformly-spaced, uniformly-speeded loaf-advancing projections actuated by the carriers adapted to advance dough pans having walls rising above the bottoms of the dough loaves, a vertically-movable continuously-rotating cutting-disk normally held in horizontal planes above the said projections and pan walls, means for moving the disk bodily down, while rotating, to bring its cutting edge into the path of the upper part of the dough, and means for preventing the disk from moving down to the lowermost plane of the dough, successively, the means for moving the disk vertically being timed substantially as set forth in relation to the movements of the other parts.

5. In a machine for forming incisions in the top portions of dough loaves respectively positioned in uniformly-sized four-walled pans arranged to advance in a plurality of parallel, adjacent, longitudinal series, the walls of the pans extending to points above the bottom of the dough loaves, the combination of means for uniformly moving the pans while uniformly distanced each from the next in its longitudinal series, and in continuing succession, a transversely-extended series of simultaneously-actuated rapidly-rotating power-driven sharp-edged cutting disks, one disk for each longitudinal series of pans, and means timed in relation to the travel of the pans for first lifting the disks, each on a line immediately in front of the rear end wall of a pan to horizontal planes above those of the said wall, and then moving them downward each in a vertical line behind the front end wall of the next pan to horizontal planes below the tops of the dough masses.

6. In a machine for forming incisions in the top portions of dough loaves, the combination of the table, the power-shaft, means for advancing uniformly-sized, uniformly-spaced four-walled pans longitudinally along the table, a series of rapidly-rotating power-driven sharp-edged simultaneously-actuated cutting disks, means for moving the said disks bodily, while rotating, from positions above to positions below the top edges of the pans, power devices whereby the said shaft actuates the pan-advancing devices, and power devices whereby the said shaft actuates the devices which bodily move the disks.

7. In a machine for forming incisions in the top portions of dough loaves, the combination of the frame, the table, the power shaft, the means for advancing uniformly-sized, uniformly-spaced, four-walled dough pans, the series of rapidly-rotating power-driven sharp-edge cutting-disks movable bodily vertically from positions above to positions below the upper edges of the dough pans, means timed in relation to the travel of the pans for lifting and lowering the disks, means for preventing the disks from moving down to the lowermost planes of the dough pans, a train of power devices driven by said shaft for actuating the pan-advancing devices, and a train of devices actuated by said shaft for bodily moving the disks vertically.

8. The herein described method of preparing dough loaves, it consisting in exposing the said loaves in proofing ovens and, while therein, expanding them approximately to the limit of expansion and permitting the gases evolved therein to distend the inclosing skins, then forming incisions in and through the said skins and through the thin walls of the upper interior cells to permit the escape of steam and gases, without exerting downward pressure on said skin and cell walls and without tearing or removing any of the particles of dough, and finally baking the said loaves in baking ovens.

9. The herein described method of preparing dough loaves for introduction to the baking oven, it consisting in exposing the said loaves in proofing ovens, and, while therein, expanding them approximately to the limit of expansion and permitting the gases evolved therein to distend the inclosing skins, then forming incisions through the top distended skin by thin cutters moved through the dough at a speed sufficiently high to effect the cutting of the skin and cell walls without requiring an appreciable downward pressure thereon, extending the cuts downward to equal fixed pre-determined depths, and finally baking the said loaves.

In testimony whereof, I affix my signature.

WM. L. TAGGART.